United States Patent [19]

Adelman et al.

[11] 4,151,126
[45] Apr. 24, 1979

[54] POLYOLEFIN/CONDUCTIVE CARBON COMPOSITES

[75] Inventors: Robert L. Adelman, Wilmington; Edward G. Howard, Jr., Hockessin, both of Del.

[73] Assignee: E. I. Du Pont de Nemours and Company, Wilmington, Del.

[21] Appl. No.: 790,857

[22] Filed: Apr. 25, 1977

[51] Int. Cl.$^2$ ............................ C08K 3.04; C08K 9/10
[52] U.S. Cl. ................................. 252/508; 252/506; 252/507; 252/509; 252/511; 260/42.14; 260/42.46; 260/42.53; 264/129
[58] Field of Search ............... 260/42.53, 42.46, 42.14; 252/511, 506, 507, 508, 509

[56] References Cited

U.S. PATENT DOCUMENTS

| | | | |
|---|---|---|---|
| 3,256,236 | 6/1966 | Herman et al. | 260/42.46 |
| 3,297,466 | 1/1976 | Herman et al. | 260/42.53 |
| 3,950,303 | 4/1976 | Lipscomb | 260/42.46 |

*Primary Examiner*—James H. Derrington

[57] ABSTRACT

Shaped polyolefin objects having decorative metal coatings are obtained by (1) cold compressing a solid, substantially homogeneous, particulate, highly-filled polyolefin composite containing polyolefin, particularly polyethylene, and at least 33% by weight of filler including at least 10% of conductive carbon and, optionally, an inorganic filler compound, in which the polyolefin is polymerized onto the surface of the filler, (2) sintering the compressed shaped object, and (3) electroplating the sintered object.

7 Claims, No Drawings

POLYOLEFIN/CONDUCTIVE CARBON COMPOSITES

BACKGROUND OF THE INVENTION

1. Field of the Invention

This invention relates to conductive polyolefin composites. More particularly, it relates to composites containing polyolefin, conductive carbon and, optionally and preferably, an inorganic filler, and to a process for electroplating molded objects of these composites.

2. Description of the Prior Art

The utility of organic polymers has been broadened in recent years to the degree that rigid polymers such as the nylons, ABS (acrylonitrile/butadiene/styrene) and polyacetal resins have begun to replace the more conventional metal, wood and ceramic materials. Methods have been developed for increasing the rigidity of lower cost polymers such as polyolefins, mostly by filling them with finely divided solids or fibrous fillers, thereby making them candidates for many of these applications.

One such method that is particularly advantageous is described in German Patent Publication 2,459,118. Briefly, in this method a solid, homogeneous, highly filled composite of polyolefin, particularly polyethylene, with an inorganic filler is made by polymerizing the olefin onto the surface of the filler, the filler having had interacted at its surface a catalytically active transition metal species. The resulting composites can be molded to articles of superior physical properties.

A particular field in which organic polymers, particularly ABS, have partly replaced metals is that of shaped articles coated with decorative metal surfaces, such as automobile grilles, wheel covers, appliance bases, and knobs. ABS, however, has at least two disadvantages in this use. It is relatively expensive in comparison with polymers such as lower polyolefins. In addition, in common with other organic polymers, it requires a number of laborious and expensive treatment steps to make the surfaces of its molded objects receptive to electroplating, the common method of applying decorative metal coatings.

Polyolefins would be excellent substrates for electroplating because of their high toughness, low price, and ready availability. In general, however, a number of both mechanical and chemical treatments are required to satisfactorily electroplate polyolefins; see W. Goldie, "Metallic Coating of Plastics", Vol. II, pages B 367–372, Electrochemical Publications Ltd., 1969.

One process of electroplating certain polypropylene compositions without the use of a prior electroless plating sequence is described by Adelman in U.S. Pat. No. 4,002,595. In this process, a polypropylene molded object containing polypropylene, polyethylene, a rubber, carbon black and optionally silicate mineral is preconditioned in a five to eight step etching and rinsing sequence involving chromic acid followed by electroplating. It would be desirable to provide a process which is applicable to polyethylene and polypropylene molded objects which does not involve the pollution problems and expense associated with the use of chromic acid etchants.

Another way of rendering polymers such as polyethylene electroplatable is taught by Amos in U.S. Pat. No. 3,416,992. This technique involves, for example, the mixing and homogeneous blending of microfine polyethylene powder with expanded graphite, compressing and baking the mixture and plating the resulting slugs. The expanded graphite is prepared by treating natural graphite having a particle size of 10 to 325 mesh U.S. Standard Sieve (2000 to 44 microns) with concentrated acid, washing and rapidly heating in a hydrocarbon flame. It is stated that these resin/expanded graphite slugs are plated much more effectively than slugs prepared with powdered carbon. Since powdered carbon is less expensive than expanded graphite, it would be desirable to provide a way to effectively electroplate composites containing powdered carbon.

SUMMARY OF THE INVENTION

This invention is directed to polyolefin composites containing powdered carbon which can be molded into objects which are readily electroplated to provide decorative metal coatings. The filled polyolefin composite of this invention is a solid, homogeneous, particulate, polyolefin composite which comprises by weight (a) about 10 to about 67% of ultra high molecular weight polyolefin selected from the group consisting of polyethylene and copolymers of ethylene containing up to about 15% by weight of units derived from one or more 1-alkenes of 3 to 10 carbons, and (b) about 33 to about 90% of finely-divided filler, said filler comprising by weight, based on the total composite, (1) about 10 to about 90% of conductive carbon having a weight-average equivalent spherical particle diameter of about 5 to about 500 millimicrons, provided that, when the polyolefin content is greater than about 60%, the conductive carbon content is greater than about 30%, and (2) 0 to about 80% of inorganic filler compound having a neutral-to-acidic surface and a weight-average equivalent spherical particle diameter of about 0.1 to about 50$\mu$, in which essentially all of the polyolefin is polymerized onto the surface of the filler, and essentially all of the filler has polyolefin polymerized onto its surface, and the composite has a resistivity of not more than about 5 ohm cm in compression molded form. The compression molded object used to determine this resistivity value should be prepared by cold-forming at 10,000 psi for one minute, followed by sintering at 180° C. for 20 minutes.

Filled polyolefin shaped objects having decorative metal coatings are readily provided by the process which comprises (1) placing the above composite in a mold and compressing at a pressure of about 100 to about 100,000 psi and a temperature below the melting point of the polyolefin, (2) removing the resulting shaped object from the mold, (3) sintering the shaped object at a temperature of about 105° to about 225° C., and (4) electroplating a decorative metal coating onto the surface of the shaped object.

DESCRIPTION OF THE PREFERRED EMBODIMENT

The primary characteristic which distinguishes the polyolefin/conductive carbon composites of this invention from many of the filled polyolefins compositions of the prior art is that they are homogeneous, that is, essentially all of the polyolefin is polymerized onto the surface of the filler and essentially all of the filler has polyolefin polymerized onto its surface. By the term "essentially all" it is meant that the amount of filler-free polymer and polymer-free filler present is not sufficient to materially alter or detract from the basic and novel characteristics of composites containing none of these components. In other words, this term excludes filler-free polymer and polymerfree filler in amounts which prevent the advantages of this invention from being realized.

Another characteristic which distinguishes the filled polyolefin composites of this invention from many of the filled polyolefin compositions of the prior art is that the composites of this invention contain conductive carbon.

Another important feature which distinguishes the filled polyolefin composites of this invention from many of the filled polyolefin compositions of the prior art is that they are highly filled, that is, they contain at least about 33%, and up to about 90%, by weight, of filler.

Still another characteristic which distinguishes the filled polyolefin composites of this invention from many of the filled polyolefin compositions of the prior art is that the polyolefin is of ultra high molecular weight. By "ultra high molecular weight" is meant a polymer having a melt index of zero, measured by ASTM test method 1238-57T. These polymers do not flow and thus cannot be extruded or injection molded.

The homogeneous composites of this invention are prepared by a variety of specific processes whereby the olefin is polymerized onto filler having the transition metal component of a coordination catalyst interacted at its surface in the presence of an organoaluminum compound. The term "interacted" means the transition metal component is bonded directly, or indirectly through the organoaluminum compound, to the filler so that it cannot be washed off. The term "at its surface" refers to the monomolecular layer of the filler which contains active polymerization sites.

There are two important concepts which must be adhered to in preparing the composites of this invention. The first concept is that essentially all of the polymerization must occur on the surface of the filler rather than in solution. This can be accomplished in either of two ways. The preferred method is to use a transition metal compound which, in combination with an organoaluminum compound, is essentially inactive as an olefin polymerization catalyst in solution, but which, when absorbed onto the surface of the filler, is active as a polymerization catalyst.

The second method of accomplishing the first concept involves the use of a transition metal compound which is active in solution. In this case the procedure has to be modified so that all transition metal present during polymerization is irreversibly adsorbed onto the surface of the filler. Thus, for example, in the case of titanium tetrachloride, excess titanium tetrachloride not adsorbed by the filler must be removed and the adsorbed titanium compound hydrolyzed to titanium oxide. When the transition metal compound has low or only moderate activity in solution, but is much more active when adsorbed onto the filler, for example, 50 to 100 times more active, then it can be used to form homogeneous composites without going through this modification.

The second important concept which must be adhered to in preparing these composites is that polymerization must take place on essentially all of the filler particles. If the catalyst is very active and is readily adsorbed by the filler, for example, as in the case of tetrabenzylzirconium, care must be taken that the relatively small amount of catalyst required is not all adsorbed by only part of the filler. This situation is overcome by first reacting the filler with excess organoaluminum compound, which reduces the rate at which the transition metal compound is adsorbed by the filler, and then adding the transition metal compound. Another way of overcoming this situation is to prereact an excess of the organoaluminum compound with the transition metal compound to form a complex which is less readily adsorbed by the filler, and then react this complex with the filler. With some less reactive transition metal compounds, for example chromium octoate, the transition metal compound can be reacted directly with the filler without any deleterious effect.

The composites of this invention contain about 10 to about 67% by weight of polyolefin. At least about 10% by weight of polyolefin is necessary to provide sufficient binder to form tough molded objects. The minimum amount of polyolefin necessary in any specific case will depend on the density, nature and particle size of the filler. With larger particle sizes and higher particle densities, less polyolefin is needed.

As the polyolefin content is increased, either with carbon as the only other component, or with enough carbon to impart good conductivity (i.e., resistivity well below 5 ohm cm), the resistivity of the molded objects increases slowly, up to about 50% polyolefin, at which point the resistivity of a typical product is of the order of about 1.6 ohm cm. As the polyolefin content is increased beyond about 50%, resistivity increases more rapidly, nearly doubling to about 2.5 ohm cm for a typical product containing about 55% polyolefin, and tripling to about 5 ohm cm at 67% polyolefin. On the basis of resistivities, which directly influence the electroplating behavior of molded objects, the products of the invention should preferably contain about 15 to about 60% polyolefin, and most preferably about 20 to about 55%.

The polyolefins which are useful in accordance with this invention are polyethylene and copolymers of ethylene containing up to about 15% by weight of units derived from one or more 1-alkenes of 3 to 10 carbons. Suitable comonomers include propylene, 1-butene, 3-methyl-1-butene, 4-methyl-1-pentene, 1-hexane, 1-octene, 1-decene, and mixtures thereof. Other monomers known to be reactive in coordination polymerization reactions, for example, linear, nonconjugated diolefins such as 1,4-hexadiene, 1,6-octadiene, dicyclopentadiene, norbornene and norbornene derivatives such as ethylidenenorbornene, may also be added in small amounts. The preferred polyolefin is polyethylene.

The composites of this invention also contain about 10 to about 90% by weight of finely-divided, conductive carbon. By "conductive carbon" is meant those carbons which have an electrical resistivity in the cured, natural rubber formulation specified in ASTM D1522-60T of not greater than about 160 ohm cm, and preferably less than about 100 ohm cm, and most preferably less than about 50 ohm cm. This is referred to in the claims as "rubber formulation resistivity".

Suitable crystalline and partially crystalline forms of carbon are graphite and carbon black, respectively. Graphite is natural occurring and also may be obtained by heating coal in an electric furnace. Conductive carbon blacks are obtained from incomplete combustion of hydrocarbon vapors, and include the acetylene blacks, the channel blacks and, most important, the furnace blacks.

These conductive carbons generally have weight-average equivalent spherical particle diameters of about 5 to about 500 millimicrons. The term "equivalent spherical particle diameter" is used herein because not all of the useful fillers are composed of spherical particles, and thus the particles do not have diameters as such. The equivalent spherical particle diameter of a given particle is the diameter of a sphere having the same volume.

The minimum amount of conductive carbon required for adequate conductivity will vary some, depending on the type of carbon used, and particularly on its conductivity. At least about 10% conductive carbon is required to give the product a resistivity of not more than about 5 ohm cm. A maximum carbon content is imposed only by the necessity of having at least about 10% polyolefin present. Preferably, the carbon content is about 15 to about 75%, and most preferably about 20 to about 60%. When the polyolefin content is greater than about 60%, the conductive carbon content should be greater than about 30%. When nonconductive carbon blacks are blended with the conductive carbon as filler having some conductive properties, they should not be counted as conductive carbon.

Any of a number of commercially available conductive carbon blacks can be used. One particularly suitable type is the Cabot Corporation's "Vulcan" XC-72, ASTM (D2516) designation "Cabot N-472". Other types of carbon blacks that can be used, either alone or in combination with a "Cabot N-472" type, include "Vulcan" SC, ASTM designation "Cabot N-294"; "Vulcan" C, ASTM designation "Cabot N-293"; "Vulcan" 6, ASTM designation "Cabot N-220"; "Vulcan" 9, ASTM designation "Cabot N-110"; and Regal 600, ASTM designation "Cabot N-219". With carbon blacks of somewhat lower conductivity, proportionately larger amounts will usually be required to realize a given conductivity in a product of the invention. The exact amounts necessary to provide any desired conductivity can readily be determined by simple experimentation.

It has been further found, as an optional feature, that replacing some of the polyolefin in the composite with an inorganic filler compound will increase its conductivity. This is the case even though the carbon content does not change and even though the inorganic filler above does not confer conductivity on polyolefin, e.g., even though the corresponding polyolefin/inorganic filler composite is nonconductive. In other words, use of inorganic filler permits more effective use of the carbon. Thus, a polyethylene composite containing 14.0% carbon and 14.0% clay had a resistivity of 114,000 ohm cm and could not be electroplated, whereas a polyethylene composite containing 14.4% carbon and 33.5% clay had a resistivity of 4.8 ohm cm and was electroplated to give adherent metal coatings.

The composite can contain up to about 80% by weight, based on the total composite, of inorganic filler compound, preferably about 10 to about 70%, and most preferably about 20 to about 60%. When equal amounts of carbon and inorganic filler are used, the minimum content of each component required for good conductivity is about 20%.

The ability to "replace" some of the polyolefin in a product of the invention with an inexpensive filler permits the preparation of lower-cost composites without sacrifice of desired physical or electrical properties. Of the three components of the products of the invention, inorganic fillers are the least expensive and conductive carbons are the most expensive, with the polyolefin in between. From an economic point of view, therefore, and within the limits imposed or required by desired physical and electrical properties, the preferred products will be those with relatively low polyolefin and carbon contents, particularly the latter, and relatively high inorganic-filler contents. The total filler content of the composites of this invention should be about 33 to about 90% by weight, preferably about 40 to about 85%, and most preferably about 45 to about 80%.

Any inorganic filler compound can be used in accordance with this invention provided it meets the criteria described below. By "inorganic filler compound" is meant a solid compound which does not contain carbon except in the form of carbonate. Suitable fillers include minerals, for example, alumina hydrates such as alumina trihydrates and the like; metal phosphates and sulfates such as insoluble calcium phosphates, calcium sulfate, and barium sulfate; silicas ($SiO_2$) such as sand, diatomaceous earth and pumice; metal carbonates such as barium carbonate, calcium carbonate and zinc carbonate; metal oxides such as titania (e.g., rutile and anatase), zinc oxide, antimony trioxide, and iron oxide (e.g., magnetite $FeO.Fe_2O_3$); basic aluminum sodium carbonates such as dawsonite; water-insoluble silicates such as aluminum silicate clays; and natural mixtures of these compounds such as slate. Other suitable inorganic fillers include synthetic silicas; synthetic carbonates; glass powder and fibers; synthetic silicates such as "Silene" L, a precipitated, hydrated calcium silicate; and synthetic titanates such as "Fybex", an acicular potassium titanate.

By "alumina hydrates" is meant compositions of the formula $Al_2O.xH_2O$ in which x is about 1.5–3.0. By "alumina trihydrates" is meant compositions of the formula $Al_2O_3.xH_2O$ in which x is about 2.5–3.0.

The preferred inorganic filler compounds are the water-insoluble silicates. Typical water-insoluble silicates include calcium silicates such as wollastonite; magnesium silicates such as talc; magnesium calcium aluminum silicates such as montmorillonite and serpentine; lithium aluminum silicates such as spodumene; potassium aluminum silicates such as feldspar and mica; magnesium iron silicates such as olivine; aluminum silicates such as sillimanite and kyanite; and aluminum silicate clays such as kaolinite, attapulgite, fuller's earth and bentonite. The preferred water-insoluble silicates are the aluminum silicate clays, and the most preferred are the kaolinite clays.

The inorganic filler used in accordance with this invention should have a neutral-to-acidic surface. Many fillers such as alumina hydrates, silicas, water-insoluble silicates, insoluble calcium phosphates, titania, zinc oxide, iron oxide, antimony trioxide and mixtures thereof naturally have neutral-to-acidic surfaces. Other fillers such as calcium sulfate, calcium carbonate, barium sulfate, zinc carbonate and dawsonite are basic in nature and thereby inhibit polymerization. Still other minerals such as mica, silicas which contain alkali metal or alkaline earth metal, and wollastonite give variable polymerization behavior.

In those cases where the filler is not neutral-to-acidic, polymerization inhibition difficulties can be overcome by first coating the filler with about 0.01 to about 2%, based on the filler, of an acidic oxide such as silica, alumina or acid phosphate, thereby giving the filler an acidic surface. More could be added but would serve no useful purpose. The amount of acidic oxide at the surface of the filler can vary from about 0.001 to about 0.5 millimole per gram of filler, and preferably about 0.01 to about 0.05 millimole.

These acidic oxide coatings are obtained by treating the filler with a compound which is hydrolyzed to an acidic oxide. For example, carbonate fillers are coated by simply mixing an aqueous suspension containing about 10–50% by weight of the solid filler with an aqueous solution containing about 1–10% by weight of an aluminum salt. Other minerals can be coated by treating with an aqueous aluminum salt solution and ammonia. Acid phosphate coatings can be obtained by treating the filler with phosphoric acid. Silica coatings can be obtained, for example, by treating calcium carbonate with silicon tetrachloride.

Inorganic filler contents are determined by ash analysis, that is, from the ash content on combustion. Since combustion removes all water of hydration, the inorganic filler content is calculated from the ash content by accounting for this loss of water during combustion.

The inorganic fillers used in accordance with this invention should have a weight-average equivalent spherical particle diameter of about 0.1 to about 50$\mu$. Preferably the weight-average equivalent spherical particle diameter is about 0.5 to about 40$\mu$, and most preferably is about 1 to about 25$\mu$.

When an inorganic filler is used in addition to conductive carbon, it is preferred that the two solids be thoroughly mixed before the polymerization is begun. This can be accomplished by milling, e.g., in a paint mill, ball mill, colloid mill, rod mill, or sand grinder. The process usually requires from about 5 minutes to about 24 hours. The milling can be done with the dry solids, but conveniently and preferably it is done with a slurry of the solids in an inert diluent, such as the one to be used in the polymerization step. The presence or absence of aggregates of undispersed filler or carbon can be determined by smearing a sample of the mixture on paper. The resulting streak will be uniform when the mixture is homogeneous. The liquid can be removed, if desired, by evaporation.

Before the filler can be used in the polymerization reaction, it may first be freed of gaseous oxygen, water and other polar impurities that interfere with the polymerization reaction. This is readily accomplished by sweeping the filler with an inert gas such as nitrogen with heating.

The polymerization is carried out by dispersing at least about 1 weight/volume percent, and preferably about 5 weight/volume percent of the filler in an inert, liquid hydrocarbon diluent. The term "weight/volume percent", as used throughout the specification and claims, refers to grams of solid added to 100 milliliters of liquid.

Suitable inert, liquid hydrocarbon diluents for use as the polymerization medium include aromatic, saturated aliphatic, and saturated alicyclic hydrocarbons. While the liquid cyclic and acyclic hydrocarbons of about 5–10 carbons such as pentane, hexane, heptane, octane, decane, cyclohexane, benzene, toluene, xylene and tetralin are preferred, the lower boiling propanes and butanes can also be used.

The diluent should be anhydrous and preferably is made so by passing it through highly absorptive alumina such as Woelm acid alumina column immediately prior to use. The liquid diluents can also be freed of contaminants such as oxygen and water by treatment with traces, e.g., about 0.50%, based on the weight of diluent, of the organoaluminum compound to be used as a catalyst component in the polymerization. This, along with the acid alumina treatment, ensures maximum avoidance of moisture and other impurities.

The polymerization process is carried out using the conductive carbon or the conductive carbon/inorganic filler mixture as the substrate for the polymerization catalyst. The filler is pretreated or treated in situ during the polymerization so that it has a catalytically active transition metal compound interacted at its surface. By "transition metal" is meant a metal of Group IVa, Va or VIa of the Periodic Table published in Advanced Inorganic Chemistry by Cotton and Wilkinson, third edition (1972), Interscience Publishers. These metals are titanium, zirconium, hafnium, vanadium, niobium, tantalum, chromium, molybdenum and tungsten.

The transition metal components of coordination catalyst systems disclosed in the prior art as being suitable for olefin polymerization are generally suitable for use in accordance with this invention. The filler should contain sufficient transition metal compound to provide about 0.000001 to about 1.7 milligram-atom, per gram of filler, of transition metal, and preferably about 0.00001 to about 0.8 milligram-atom interacted at the surface of the filler.

The processes used to prepare the composites of this invention also include as part of the coordination catalyst system an organoaluminum compound selected from the group consisting of trialkylaluminums ($R^1R^2R^3Al$), dialkylaluminum hydrides ($R^1R^2AlH$), dialkylaluminum alkoxides ($R^1R^2$-$AlOR^3$), alkylaluminum halides ($R^1R^2AlX$ and $R^1AlX_2$) and polymeric hydrocarbylaluminums in which the alkyl groups, alike or different, have 1 to about 10 carbons each. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as aluminumisoprene polymers are described in U.S. Patent 3,149,136. The trialkylaluminums and dialkylaluminum hydrides are preferred. The alkylaluminum halides are not preferred since the final polymer is corrosive to metal in many applications. Preferably the composites of this invention are free of residual halogen and thus noncorrosive. The organoaluminum compound should be present in an amount which provides a mole ratio of organoaluminum compound to transition metal compound of about 1000:1 to about 4:1, and preferably about 40:1 to about 10:1.

One approach to preparing these products involves techniques for pretreating the filler to contain certain transition metals in the form of a catalytically-active transition metal compound interacted at its surface, and isolating the transition metal compound-containing filler from any transition metal compound not attached to the filler. The polymerization is then carried out by dispersing the pretreated filler in an inert, liquid hydrocarbon along with the organoaluminum compound and the olefin.

For example, any of the neutral-to-acidic fillers described herein can be pretreated to provide a titanium compound interacted at its surface. In accordance with this process, the filler is first contacted with a hydrolyzable titanium compound, the adsorbed titanium species is hydrolyzed, and the titanium-treated filler is activated.

Suitable hydrolyzable titanium compounds include titanium tetrachloride, tetraalkyl titanates and mixtures thereof wherein the alkyl groups, alike or different, have 1-6 carbon atoms. In the case of titanium tetrachloride, the filler can be exposed to titanium tetrachloride vapor until the surface is saturated. In the case of the titanate esters, the filler is milled with a solution of titanate ester. Since the titanium compound is adsorbed from the solution by the filler, the concentration of titanium in the solution may vary over wide limits provided the solution at least contains the minimum amount of titanium that is desired at the surface of the filler. Suitable tetraalkyl titanates include tetramethyl titanate, tetraethyl titanate, tetrapropyl titanate, tetraisopropyl titanate, and the like. Contacting of the filler with titanium tetrachloride or a titanate ester is believed to result in bonding a titanium-containing group to the surface of the substrate filler. The titanium-containing filler is then freed of unadsorbed titanium compound by washing or by vaporization such as by sweeping with hot nitrogen.

The adsorbed titanium compound is then hydrolyzed to what is believed to be a derivative of titanic acid chemically bound to the surface of the particle. When the titanium compound is titanium tetrachloride, this can be accomplished by contacting the titanium-treated filler with aqueous or moist gaseous ammonia to ensure that all of the chlorine is removed. In the case of a titanate ester, hydrolysis of the titanium compound can be accomplished by exposing the titanium-treated filler to moist air.

The titanium-treated filler is then activated by heating at a temperature of at least about 100° C. Although the form of the titanium compound on the surface of the activated filler is not known with certainty, it is believed to be closely related to titania. After activation, the polymerization is carried out by contacting the pretreated filler with an organoaluminum compound and olefin.

Any of the neutral-to-acidic fillers described herein can also be pretreated to provide a chromium compound interacted at the surface. The chromium treating step is carried out by treating the filler with a solution of a chromium(III) compound in a suitable solvent. The solvent used to prepare this solution may be water or any organic liquid in which the chromium(III) compound is soluble. A preferred class of solvents includes polar solvents such as water and alcohols, especially alkanols such as methanol. Suitable water-soluble or organic solvent-soluble chromium compounds include chromium nitrate; chromium halides such as chromium chloride, bromide and iodide; $C_1$ to $C_{12}$ organic acid salts of chromium such as chromium acetate, chromium oxalate, chromium octoate, and chromium nephthenate; chromium sulfate; fumaratochromium(III) nitrate; methacrylatochromium hydroxide; methacrylatochromium chloride; and the like; and mixtures thereof.

The chromium-modified filler is activated by drying at a temperature of about 25° to about 400° C., preferably about 150° to about 250° C., and most preferably about 175° to about 200° C. At temperatures below the boiling point of the solvent being removed, the drying process may be assisted by use of vacuum. After activation, the polymerization is carried out by contacting the pretreated filler with an organoaluminum compound and olefin.

Another and a preferred approach to preparing the homogeneous composites of this invention involves the adsorption at the surface of the filler in the polymerization medium of a hydrocarbon-soluble, organic, transition metal compound which is relatively more active as a catalyst when adsorbed at the surface of the filler, for example at least about 50 times more active, than when in solution. Accordingly, this approach does not require removal of excess transition metal compound from the polymerization reaction medium. By "hydrocarbon-soluble" is meant an organic transition metal compound which is soluble in at least one hydrocarbon solvent or can be solubilized in such solvent by the presence of an organoaluminum compound.

In accordance with this method, the polymerization is carried out by dispersing any of the neutral-to-acidic fillers described herein in an inert, liquid hydrocarbon diluent along with a hydrocarbon-soluble, organic, transition metal compound, and an organoaluminum compound.

The hydrocarbon-soluble, organic, transition metal compounds used in this approach are of the formula $$L_n M X_p$$

wherein L is an organic ligand bonded to M by carbon, oxygen, or nitrogen; M is a transition metal; X is a non-organic ligand, preferably halogen, n is an integer from 1 to the highest valence of M; and p is an integer of from 0 to 1 less than the highest valence of M. Suitable L groups include hydrocarbyl such as alkyl and alkenyl, substituted hydrocarbyl such as substituted alkyl and substituted alkenyl, hydrocarbyloxy, hydrocarboncarbonyloxy, hydrocarbylsilylhydrocarbyl, dihydrocarbylamino, α-diketonato, and the like.

Illustrative classes of suitable hydrocarbon-soluble, organic, transition metal compounds include tetrabenzylzirconium and related tetrabenzyl, tetrakis(substituted benzyl), and tetrakis(naphylmethyl) derivatives of titanium, zirconium, and hafnium disclosed by Long in U.S. Pat. Nos. 3,635,935, Pioli et al. in 3,681,317, and Candlin et al. in 3,738,944; tetrakis(trimethylsilylmethyl)zirconium and related compounds disclosed by Candlin et al. in 3,738,944; and tetraneophylchromium and the related tetrahydrocarbylchromiums disclosed by Kruse in 3,798,250.

A preferred class of hydrocarbon-soluble, organic, transition metal compounds are those in which some or all of the L groups are substituted alkyl groups of the formula $$-CH_2Y$$

in which Y represents an atom or group capable of interaction with the vacant d-orbitals of the metal M. Suitable Y groups include aromatic groups such as phenyl, naphthyl, substituted phenyl and substituted naphthyl groups, and groups of the formula $$M'(R)_3$$

in which M' is carbon or silicon, and R, alike or different, is hydrocarbyl such as alkyl or aryl.

Specific hydrocarbon-soluble, organic, transition metal compounds include tetrabenzylzirconium, tetrabenzyltitanium, tetrabenzylhafnium, tetraneophylzirconium, tetraneophychromium, tetraneophyltitanium, tetrakis(p-isopropylbenzyl)titanium, tetratolyltitanium, tetrakis(tetraethylbenzyl)titanium, tetramethyltitanium, tetraneopentylzirconium, tetraneopentyltitanium, tetraneopentylhafnium, tetrakis(p-methylbenzyl)zirconium, tetrakis(1-naphthylmethyl)titanium, tetrakis(trimethylsilymethyl)zirconium, tribenzylzirconium chloride, tris($\pi$-allyl)zirconium bromide, tris($\pi$-methallyl)-titanium chloride, tetrakis($\pi$-allyl)hafnium, tetrakis($\pi$-allyl)chromium, tetrakis($\pi$-allyl)niobium, chromium octoate, chromium naphthenate, tetrakis(2,4-pentanedionato)zirconium, tetrakis(2,4-pentanedionato)titanium, tetrakis(dimethylamino)titanium, tetrakis(diethylamino)vanadium, and the like.

The amount of hydrocarbon-soluble, organic, transition metal compound added to the polymerization reaction should be equivalent to about 0.00001 to about 0.1 milligram-atom of transition metal per gram of filler and preferably about 0.0001 to about 0.01 milligram-atom. This amount will provide filler having interacted at its surface sufficient organic transition metal compound to provide about 0.000001 to about 0.1 milligram-atom of transition metal per gram of filler and preferably about 0.00001 to about 0.01 milligram-atom.

The preferred hydrocarbon-soluble, organic, transition metal compounds are the zirconium compounds. Preferably the polymerization reaction is carried out in the presence of an amount of zirconium equivalent to about 0.003 to about 0.0075 milligram-atom of zirconium per gram of filler. This amount will provide filler having interacted at its surface sufficient organic transition metal compound to provide about 0.0001 to about 0.001 milligram-atom of zirconium per gram of filler.

The most active of the hydrocarbon-soluble, organic, transition metal compounds are the zirconium compounds. In order to provide homogeneous composites using hydrocarbon-soluble, organic, zirconium compounds, it has been found that the initial contact for the filler and the transition metal compound should not be between each other. This same rule is advantageously followed in the case of the less active transition metal compounds, with the possible exception of chromium compounds of low activity where satisfactory results are obtained by contactng the filler and the transition metal compound directly. Initial contact between the filler and the transition metal compound leads in most cases to a heterogeneous product and should be avoided.

In preparing homogeneous products by this approach, initial contact between the filler and the transition metal compound can be avoided by proceeding in one of two ways. In accordance with one method, the filler is first reacted with a large excess of the organoaluminum compound. The transition metal compound is then added. The mole ratio of organoaluminum compound to transition metal compound should be in the range of about 1000:1 to about 4:1, and preferably about 40:1 to about 10:1.

Although it is not intended that this invention be restricted to any particular theory, it is believed that this excess organoaluminum compound reacts with many of the hydroxyl groups of the surface of the filler, thus limiting the reactive sites available to the transition metal compound. The transition metal compound now reacts uniformly with all of the filler particles as it seeks the limited number of available sites.

In accordance with another and preferred method of avoiding initial contact between the filler and the transition metal compound, the transition metal compound is first reacted with a large excess of the organoaluminum compound in amounts which provide a mole ratio of organoaluminum compound to transition metal compound of about 1000:1 to about 4:1 thereby forming a complex. The dispersion of filler in the hydrocarbon diluent is then contacted with the complex.

The polmerization reaction can be carried out at temperatures of about 0° to about 250° C. Polymerization temperatures below that at which the diluent swells the polyolefin are preferred since swelling greatly increases the viscosity of the reaction mixture and makes agitation difficult or impossible unless low concentrations of materials are used. For practical reasons, polymerizations should be run at temperatures not in excess of about 100° C. when pure alkanes or cycloalkanes are used. When a strong polyolefin solvent such as benzene, toluene, tetralin or xylene is used, even lower temperatures such as about 60° C. or below should be used. Preferably temperatures of about 25° to about 100° C. are used, and most preferably about 50° to about 90° C.

Polymerization is readily carried out at pressures from about atmospheric to about 500 atmospheres. Pressures in the lower range are generally preferred, and about 3-70 atmospheres are not satisfactory. The course of the polymerization reaction is followed by noting the change in weight of the supply vessel containing the olefin. The supply vessel is normally used to maintain the pressure in the reaction vessel. Reaction times may vary over a wide range, for example, from a few seconds to about 24 hours.

When combinations of particulate fillers are used, initimate mixing is desirable to provide finely-divided, uniform composites. Agitation during polymerization controls both particle size and uniformity of composition. Strong agitation, as achieved with very rapid stirring, gives a fine-grained, free-flowing product. This is best achieved by use of an autoclave equipped with an efficient stirrer. The resulting polyolefin/filler composite is isolated as a free-flowing, homogeneous powder by means of conventional steps such as filtering, washing and drying.

The particle size of the filler polyolefin composite can vary over the range of about $0.1\mu$ to about 5 mm depending on the particle diameter of the filler and the amount of aggregation in the product. Aggregates are readily broken up. Preferably the particle diameter is in the range of about 1 to about $500\mu$.

It has been found in accordance with this invention that the above composites can be formed into molded objects which are readily electroplated to give a decorative metal coating. The process involves three steps, i.e., cold-forming the particulate composite of the invention to give a shaped object, sintering the shaped object, and electroplating the cold-formed, sintered object.

In the first step of the process, a composite of the invention, in the form of a powder, is placed in a mold such as a conventional three-piece mold and compressed at a pressure of about 100–100,000 psi, preferably at least about 100 psi, and most preferably at least about 5000 psi, at a temperature below the melting point of the polyolefin, to form a self-supporting article. In the second part, the article is removed from the mold and densified by heating at a temperature above the softening point of the composite, e.g., about 105°–225° C., in the absence of any pressure other than that of the atmosphere, to form a finished article.

Cold-forming and sintering is a known method of making molded articles from particulate powders, including mixtures. This method of forming gives a surface with small crevices, which are believed to serve as retention points for the metal coating put on in the electroplating step.

Because of their conductivity and their surface characteristics, molded products of the invention, formed by the process of cold-forming and sintering, can be electroplated to give adherent metal coatings, without any chemical or mechanical pretreatment of the type normally required for plastic articles. A surface-cleaning step is not required, but it has been found that a conventional cleaning with an aqueous solution of an anionic surfactant before plating usually results in improved adhesion of the metal coating.

The electroplating step is carried out by methods well known to those skilled in the art. In the examples that follow, formed objects of the invention were electroplated in copper baths to give copper coatings. Other metals such as nickel or chromium could equally well be employed. Also in the examples, the copper plating was preceded by a Watts-type nickel strike, a known technique (see Metal Finishing Guidebook and Directory, pages 344–345, Metals & Plastics Publication, Inc., Hackensack, N.J., 1974), wherein the object to be plated is first subjected to a brief nickel electroplating at low current density. This results in better adhesion and ductility of any later electroplated metal coating.

EXAMPLES OF THE INVENTION

The examples that follow illustrate the products and the process of the invention. Unless otherwise stated, all compositions of the products are by weight. Triisobutylaluminum was used as a 1 M solution in heptane, triethylaluminum, as a 1.6 M solution in heptane.

Physical properties of molded objects were determined by the following standard methods:

| Property | Test Specifications |
|---|---|
| Tensile strength, maximum (T) | ASTM D-638-71A |
| Elongation at break ($E_b$) | ASTM D-638-71A |
| Modulus in tension, initial ($M_i$) | ASTM D-638-71A |
| Izod impact strength | ASTM D-256-72A |
| Heat deflection temperature (HDT) | ASTM D-648-56 |
| Flexural strength | ASTM D-790-71 |
| Oxygen index | ASTM D-2863 |

In the tensile, elongation and modulus tests, test bars of Type I and Type V of ASTM test method 638-72 were used.

Oxygen index (OI) is a measure of the fractional part by volume of oxygen in an oxygen-nitrogen mixture necessary to support combustion of the sample. Accordingly, any value in excess of 0.21 indicates flame retardance in air.

Electrical Resistance

This gives an approximate idea of the relative resistive properties of molded objects. Resistance is determined by measuring the resistance of the molded object between two point clamps with a Simpson No. 260 volt-ohm milliammeter. As a standard practice, the clamps are usually, when possible, applied six inches apart to a plaque measuring 6.5"×3.5"×0.125". However, they can be applied closer together for smaller pieces, and for comparative purposes the resistances of any piece in ohms per inch can be calculated.

Resistivity (Specific Resistance)

This is a more accurate measurement which gives a close approximation to the volume resistivity or specific resistance. Resistivity was measured by two methods.

Method 1— This method is a standard four-probe procedure, in which a constant current is passed through a molded sample from one end contact to the other and the potential drop across the two inner contacts is measured with a high-impedance voltmeter. The resistance thus determined is converted to resistivity with the aid of knowledge of the sample geometry, i.e., normalized to the resistance of a 1-cm cube of the material measured across opposite faces.

Method 2— This procedure gives results quite close to the four-probe method and is based on a method recommended for conductive rubbers (F. J. Glaister, Cabot Corp. Technical Report RG-128). Molded bars 0.5" wide and 0.125" thick are painted with two stripes perpendicular to the long axis with conductive silver paint prepared by diluting Du Pont Electronic Products Division, S4929 "air dry" silver paint with butyl acetate to a consistency of about 5–10 poises. The stripes are $\frac{1}{4}$" wide and $1\frac{1}{8}$" apart. An assembly containing two silver-plated copper bars 1 3/16" apart mounted on a "Lucite" block is placed over the painted molding so that the bars are parallel and in contact with the painted stripes with a total force (weight) of 510 g. The resistance between the conductive bars is measured with a Triplett Model 631 ohmmeter. Resistance is independent of applied pressure. From the equation $$R = \rho \times L/A,$$

where R is resistance in ohms, $\rho$ is resistivity in ohm cm, A is cross-sectional area in cm², and L (length) is the distance between the conductive stripes in cm, $$\rho = (R \times A/L) = (\text{ohms} \times 0.5 \times 0.125 \times 2.54/1.125\text{-}) = \text{ohms} \times 0.142$$

This method gives a good estimate of the volume resistivity, as evidenced by the fact that values are not appreciably changed by change in bar thickness.

To determine the adhesion of copper platings to molded bars of the products, two grooves, each about 0.006" deep and 0.5" apart, were machined into the plated bar to give a strip 0.5" wide down the length of the bar. 90° Peel tests were then run at 1" min on an inclined-plane Chatillion tester. Adhesion was rated on a scale from poor (less than about 4 lb/in peel strength) to excellent (greater than about 12 lb/in peel strength). Some of the coatings rated excellent could not be separated from the bars at all. These are listed as "could not start". Coated bars were allowed to age for two weeks before peel tests were run.

EXAMPLE 1

A. A mixture of 7 lb of "Harwick" GK kaolinite clay that had been calcined at 950° C., 3 lb of "Vulcan" XC-72 carbon black, and enough cyclohexane to give a consistency necessary for good mixing was homogenized in a paint mill and filtered, and the solid was dried. A portion of the solid thus obtained was sieved through 80 mesh and dried further at 500° C. for 18 hr in a 30-liter/hr stream of nitrogen for use in part B.

B. A 1-liter stainless-steel autoclave equipped with a stirrer was dried at 150° C./0.5 mm for 2 hours, purged with nitrogen at 150° C. for 3 hours, and cooled under nitrogen. Deoxygenated cyclohexane (600 ml) was passed through a bed of Woelm acid alumina into an enclosed blender cup under nitrogen. Stirring was started, and 4 mmol of triisobutylaluminum was added, followed by 50 g of the dried, sieved carbon/clay mixture of part A and 0.050 g of tetrabenzylzirconium dissolved in 5 ml of toluene. The dispersion thus produced was transferred through polyethylene tubing under nitrogen pressure to the dry autoclave. The autoclave was closed, the stirrer was started at 1100 rpm, the system was heated to 40° C., and ethylene was admitted to a pressure of 100 psi. These conditions were maintained, with addition of ethylene as needed to keep the pressure at or near 100 psi for 42 min., at which time the ethylene-supply cylinder showed a loss of about 50 g of ethylene, exclusive of that used for the initial pressuring. The autoclave was simultaneously cooled and vented to atmospheric pressure, and the solid was separated by filtration, washed with cyclohexane, and air-dried. The dried solid product was sieved to give 20 g on 16 mesh, 70 g through 16 mesh on 28 mesh, and 12 g through 28 mesh. The second fraction gave 33.53% ash on combustion, corresponding to a polyethylene/carbon/clay composition of 52.1/14.4/33.5.

A plaque measuring 6.5"×3.5"×0.125" was made by pressing a sample of the 16-on-28-mesh product at 10,000 psi and 25° C. for about one minute and sintering the cold-pressed form in a circulating-air oven at 180° C. for 20 min. The resistance across 6" of the plaque was 60 ohms. Test bars cut from the plaque had the following properties:

Tensile(T): 3380, 3406 psi
Elongation ($E_b$): 71%, 42%
Modulus ($M_i$): 403, 435 kpsi
0° F. Izod impact: 6.1, 4.4 ft lb/in of notch (hinge break)

C. The resistivity of the molded plaque of part B, measured by method 2 on a cut bar 1.125"×0.625"×0.125", was 4.8 ohm cm.

Electroplating of the molded product of part B was conducted in duplicate on two bars as follows: Each bar was cleaned by being dipped for one minute in an aqueous 1% solution of Du Pont "Alkanol" DW anionic surfactant at 67° C., rinsed in running water for 20 seconds, and dried in a circulating-air oven at 105° C. for 30 minutes. It was then exposed to a low-density electric current for 3.75 minutes in a Watts-type nickel-strike bath. The composition of the bath and the conditions of the strike were as follows (see pages 344–345 of the Metal Finishing Guidebook and Directory, Metals & Plastics Publication, Inc., Hackensack, N.J., 1974):

$NiSO_4.6H_2O$: 44 oz/gal
$NiCl_2.3.5H_2O$: 6 oz/gal
$H_3BO_3$: 5 oz/gal
pH: 4
Temperature: 140° F.
Current density: 20 A/ft$^2$
Agitation: Vigorous
Filtration: Continuous, through activated carbon on filter aid Following the nickel strike, each bar was rinsed in running water for one minute, dipped in aqueous 10% sulfuric acid for 20 seconds, and rinsed in running water for 20 seconds. The plating coverage by the nickel strike was about 5% for the first bar and 100% for the second.

Each bar was then plated with copper in a bright acid copper electroplating bath by the Udylite Corporation's "UBAC" No. 1 process, described in their Bulletin CUP-UBAC-1, revised 10/21/67. The plating was carried out at a current density of 50 A/ft$^2$ for 40 minutes, and was designed to give a copper coating of about 1.5 mils. The plating coverage for each bar was 100%; the surface patterns were coarse. After two weeks, adhesion of the copper coating was poor-to-fair for each bar, and fair after baking for one hour at 95°–100° C. in a circulating-air oven.

For comparison, a polyethylene/carbon/clay (72/14/14) composite made by essentially the procedure of Example 1, but from a 1/1 carbon/clay mixture, had a resistivity of 114,000 ohm cm, measured by method 2 on a bar 1.125"×0.625"×0.125", and could not be electroplated. The combined filler content of this composite was only 28%.

EXAMPLE 2

A. By essentially the method of Example 1, part B, a dispersion was made up by combining in the stated order 600 ml of cyclohexane, 3.5 mmol of triisobutylaluminum, 70 g of the 3/7 carbon/kaolinite mixture described in Example 1, part A, and a solution of 0.140 g of tetrabenzylzirconium in 5 ml of toluene. The dispersion was processed with ethylene at 40° C. and 100 psi for 9 min, at which time the supply cylinder showed a loss of about 30 g of ethylene. The dried solid product was sieved to give 47 g through 16 mesh on 28 mesh and 62 g through 28 mesh. The second fraction gave 37.80% ash on combustion, corresponding to a polyethylene/carbon/clay composition of 46.0/16.2/37.8.

A plaque made by the method of Example 1, part B, had a resistance of 16 ohms across 6". Test bars cut from the plaque had the following properties:

Tensile (T): 3388, 3366 psi
Elongation ($E_b$): 9.2%, 7.2%
Modulus ($M_i$): 497, 503 kpsi
0° F. Izod Impact: 1.3, 1.4 ft. lb/in of notch B. The resistivity of the molded product of part A, measured by method 2 on a bar 1.125"×0.562"×0.125", was 1.9 ohm cm. When two bars were electroplated by the method of Example 1, part C, the plating coverage in the nickel strike was 100% for one bar and about 50% for the other, and the coverage in the copper plating was 100% for both bars. Adhesion of the rather coarse copper coatings was fair-to-good and good-to-excellent, both before and after baking.

For comparison, a polyethylene/carbon/clay (67.8/16.1/16.1) composite made by essentially the method of Example 2, but with uncalcined clay, had a resistivity of 6.4 ohm cm and could not be electroplated. It is very unlikely that the use of uncalcined clay is the cause of this difference. The combined filler content was only 32.2%.

EXAMPLE 3

A. By essentially the method of Example 1, part B, a dispersion was made up by combining in the stated order 600 ml of cyclohexane, 4 mmol of triisobutylaluminum, 63 g of the carbon/kaolinite mixture described in Example 1, part A, and a solution of 0.050 g of tetrabenzylzirconium in 5 ml of toluene. The dispersion was processed with ethylene at 40° C. and 100 psi for 12 min, at which time the supply cylinder showed a loss of about 50 g of ethylene. The dried product was sieved to give 2 g on 16 mesh, 33 g through 16 mesh on 28 mesh, and 65 g through 28 mesh. The third fraction gave 43.01% ash on combustion, corresponding to a polyethylene/carbon/clay composition of 38.4/18.5/43.1.

A plaque made by the method of Example 1, part B, had a resistance of 17 ohms across 6". Test bars cut from the plaque had the following properties:
  Tensile (T): 3460, 3323 psi
  Elongation ($E_b$): 7.0%, 3.9%
  Modulus ($M_i$): 482, 462 kpsi
  0° F. Izod impact: 1.5, 1.4 ft.lb/in of notch B. The resistivity of the molded product of part A, measured by method 2 on a bar 1.125"×0.562"×0.125", was 1.9 ohm cm. When two bars were electroplated by the method of Example 1, part C, the coverage in both the nickel strike and the copper plating was 100% for each bar. The copper coatings had very fine patterns. Their adhesion was excellent-to-good and fair-to-good before baking and excellent and fair after baking.

For comparison, a polyethylene/carbon/clay (63.6/18.2/18.2) composite made by essentially the procedure of Example 3, but from a 1/1 carbon/clay mixture, had a resistivity of 53 ohm cm and could not be electroplated.

EXAMPLE 4

A. A mixture of 1000 g of "Vulcan" XC-72 carbon black, 2000 g of "Alcoa" C-30BF alumina trihydrate, and 3 gal of cyclohexane was stirred to form a thick paste, which was passed through an ink mill to give a homogeneous dispersion. The dispersion was slurried with enough cyclohexane for fluidity, 200 ml of tetraisopropyl titanate was added, and the mixture was stirred for 15 minutes and filtered. The solid on the filter was washed with cyclohexane to remove excess tetraisopropyl titanate and air-dried. A portion of the product thus obtained was dried further at 100° C. for 18 hours under a 30-liter/hr stream of nitrogen for use in part B.

B. By essentially the method of Example 1, part B, a dispersion was made by combining in the state order 600 ml of cyclohexane, 1 mmol of triisobutylaluminum, 50 g of the dried 1/2 carbon/alumina trihydrate mixture described above, and an additional 2 mmol of triisobutylaluminum. The dispersion was processed with ethylene at 40° C. and 100 psi for 4 hr and 17 min, at which time the supply cylinder showed a loss of about 35 g of ethylene. The dried solid product was sieved to give 67 g through 12 mesh and 16 g of larger particles. The first fraction gave 26.05% ash on combustion, corresponding to a polyethylene/carbon/alumina trihydrate composition of 40.3/19.9/39.8.

A plaque made by the method of Example 1, part B, had a resistance of 20 ohms across 6 inches. Test bars cut from the plaque had the following properties:
  Tensile (T): 2512, 2752 psi
  Elongation ($E_b$): 7.0%, 8.0%
  Modulus ($M_i$): 272, 311 kpsi
  0° F. Izod impact: 4.0, 3.8, ft lb/in of notch
  264-psi Heat deflection: 89° C.
  Oxygen index: 0.293
The oxygen index is remarkably good for a composite containing 60% combustible material.

EXAMPLE 5

A. By essentially the method of Example 1, part A, a mixture of 5 lb of "Harwick" GK kaolinite clay that had been calcined at 950° C., 5 lb of Cabot "Vulcan" XC-72 carbon black, and enough cyclohexane to give a consistency for good mixing was homogenized in a paint mill and filtered and the solid was dried. A portion of the solid thus obtained was dried further at 500° C. for 18 hr in a stream of nitrogen at 30 liter/hr for use in part B.

B. By essentially the method of Example 1, Part B, a dispersion was made up by combining in the stated order 600 ml of cyclohexane, 3 mmol of triisobutylaluminum, 40 g of the dried carbon/clay mixture described above, and 0.100 g of tetrabenzylzirconium dissolved in 5 ml of toluene. The dispersion was processed with ethylene at 40° C. and 100 psi for 13 min, at which time the supply cylinder showed a loss of about 45 g of ethylene. The dried solid product was sieved to give 31 g through 28 mesh on 42 mesh and 62 g through 42 mesh. The second fraction gave 21.38% ash on combustion, corresponding to a polyethylene/carbon/clay composition of 57.2/21.4/21.4.

A plaque made by the method of Example 1, part B, had a resistance of 37 ohms across 6". Test bars cut from the plaque had the following properties:
  Tensile(T): 3281, 2951 psi
  Elongation ($E_b$): 373%, 201%
  Modulus ($M_i$): 327, 314 kpsi
  0° F. Izod impact: 10.1, 8.5 ft lb/in of notch (hinge break)

C. The resistivity of the molded product of part B, measured by method 2 on a bar 1.125"×0.562"×0.125", was 3.2 ohm cm. When two bars were electroplated by the method of Example 1, part C, the coverage in both the nickel strike and the copper plating was essentially 0% for the first bar and 100% for the second. The copper coating had a fine pattern. Its adhesion was poor, both before and after baking.

EXAMPLE 6

Example 5 was repeated, except that uncalcined rather than calcined "Harwick" GK kaolinite clay, 50 g of carbon/clay blend, 3.5 mmol of triisobutylaluminum, and 0.140 mg of tetrabenzylzirconium were used, the carbon/clay blend was dried at 275° C. instead of at 500° C., and the polymerization was continued until the supply cylinder showed a weight loss of 50 g of ethylene. The product was a particulate solid that passed through a 28-mesh screen. It gave 21.25% ash on combustion, corresponding to a polyethylene/carbon/clay composition of 57.4/21.3/21.3. The molded plaque had a resistance of 10 ohms across 6", and test bars had the following properties:
  Tensile (T): 3196, 3274 psi
  Elongation ($E_b$): 12.8%, 11%
  Modulus ($M_i$): 564, 588 kpsi
  0° F. Izod impact: 1.5, 1.5 ft lb/in of notch
The molded product had a resistivity of 1.9 ohm cm. In the electroplating procedure, two bars showed coverage of about 60% and 30% in the nickel strike and 100% and 100% in the copper plating. Adhesion of the rather coarse copper coatings on both polymers was fair-to-poor before baking and fair-to-good after baking.

EXAMPLE 7

A. A 1/1 carbon/kaolinite mixture was prepared by the method of Example 5, parts A and B, except that before drying at 500° C. the mixture was made very fluffy by treatment in a blender and then shaken in a sieve shaker for 10 min. Its bulk density was thereby increased from 0.1 g/ml to 0.17 g/ml.

By essentially the method of Example 1, part B, a dispersion was made up by combining in the stated order 600 ml of cyclohexane, 4 mmol of triisobutylaluminum, 40 g of dried carbon/clay mixture, and 0.100 mg of tetrabenzylzirconium dissolved in 5 ml of toluene. The dispersion was processed with ethylene at 40° C. and 100 psi for 12 min, at which time the supply cylinder showed a loss of 50 g of ethylene. The dried product was 101 g of a particulate solid that passed through a 28-mesh screen. Its bulk density was 0.26 g/ml. The product gave 22.49% on combustion, corresponding to a polyethylene/carbon/clay composition of 55.0/22.5/22.5.

Test bars cut from a plaque made by the method of Example 1, part B, had the following properties:
Tensile (T): 3634, 3644 psi
Elongation ($E_b$): 340%, 294%
Modulus ($M_i$) 374, 355 kpsi
0° F. Izod impact: 5.1, 4.5 ft lb/in of notch (hinge break)

B. The resistivity of the molded product of part A, measured by method 2 on a bar 1.125"×0.625"×0.125", was 2.4 ohm cm. When two bars were electroplated by the method of Example 1, part C, the coverage was about 20% and 20% in the nickel strike and 100% and about 30% in the copper plating. The copper platings had very fine patterns. Their adhesion was excellent-to-good before baking and excellent after baking.

EXAMPLE 8

The procedure of Example 7 was repeated, except that clay calcined at 600° C. was used, the fluffing step was omitted, and 3 mmol of triisobutylaluminum was used. The polymerization required 13 minutes. The product was 15 g of particulate solid on 28 mesh and 90 g through 28 mesh. The second fraction gave 22.77% ash on combustion, corresponding to a polyethylene/carbon/clay composition of 54.4/22.8/22.8. The molded plaque had a resistance of 20 ohms across 6", and test bars had the following properties:
Tensile (T): 3617, 3618 psi
Elongation ($E_b$): 63%, 58%
Modulus ($M_i$): 362, 335 kpsi
0° F. Izod impact: 2.5, 2.3 ft lb/in of notch (hinge break)

The resistivity, measured on a bar 1.125"×0.625"×0.125", was 2.2 ohm cm. Plating coverage was about 20% and 100% in the nickel strike and 100% and 100% in the copper plating. The copper coatings were fairly coarse. They showed poor-to-fair and poor adhesion, both before and after baking.

EXAMPLE 9

Example 8 was repeated, except that the carbon/clay mixture was not sieved before drying at 500° C. and 3.5 mmol of triisobutylaluminum and 0.140 g of tetrabenzylzirconium were used. The polymerization required 11 minutes. There was obtained 109 g of particulate solid that passed a 28-mesh screen. The product gave 22.09% ash on combustion, corresponding to a polyethylene/carbon/clay composition of 55.8/22.1/22.1. The resistance of the molded plaque was 33 ohms across 6", and test bars had the following properties:
Tensile (T): 3704, 3676 psi
Elongation ($E_b$): 153%, 80%
Modulus ($M_i$): 379, 430 kpsi
0° F. Izod impact: 3.0, 3.3 ft lb/in of notch (hinge break)

The resistivity was 2.6 ohm cm. Coverage was about 40% and 5% in the nickel strike and 100% and 0% in the copper plating. The copper plating had a very fine pattern and showed poor adhesion both before and after baking.

EXAMPLE 10

A. A mixture of 5 lbs of "Harwick" GK kaolinite clay that had been calcined at 600° C., 5 lbs of Cabot "Vulcan" XC-72 carbon black, and enough cyclohexane to give a consistency necessary for good mixing was homogenized in a paint mill and filtered, and the solid was dried. A portion of the solid thus obtained was sieved through an 80-mesh screen and was dried further at 500° C. for 18 hr in a stream of nitrogen at 30 liters/hr.

B. By essentially the method of Example 1, part B, a dispersion was made by combining in the stated order 600 ml of cyclohexane, 4 mmol of triisobutylaluminum, 50 g of the dried carbon/clay mixture, and a solution of 0.100 g of tetrabenzylzirconium in 5 ml of toluene. The dispersion was processed with ethylene at 40° C. and 100 psi for 18 min, at which time the supply cylinder showed a loss of about 50 g of ethylene. The dried, solid product was sieved to give 4 g on 28 mesh and 27 g through 28 mesh. The second fraction gave 23.39% ash on combustion, corresponding to a polyethylene/carbon/clay composition of 53.2/23.4/23.4.

A plaque made by the method of Example 1, part B, had a resistance of 17 ohms across 6". Test bars from the plaque had the following properties:
Tensile (T): 3615 psi
Elongation ($E_b$): 33%
Modulus: ($M_i$): 441 kpsi
0° F. Izod impact: 2.3, 2.0 ft lb/in of notch (hinge break)

C. The resistivity of the molded product of part B, measured by method 2 on a bar 1.125"×0.5"×0.125", was 1.8 ohm cm. When two bars were electroplated by the method of Example 1, part C, the coverages were about 10% and 100% in the nickel strike and 100% and 100% in the copper plating. The copper coatings were rather fine. They showed fair-to-good and poor-to-fair adhesion before baking and excellent (could not start) and fair adhesion after baking.

EXAMPLE 11

Example 10 was repeated, except that uncalcined "Harwick" GK kaolinite clay was used and the carbon/clay blend was dried at 250° C. instead of at 500° C. The particulate solid product was sieved to give 20 g of 16 mesh, 65 g through 16 mesh on 28 mesh and 15 g through 28 mesh. The second fraction gave 20.09% ash on combustion, corresponding to a polyethylene/carbon/clay composition of 53.2/23.4/23.4. The molded plaque had a resistance of 16 ohms across 6 inches, and test bars had the following properties:
Tensile (T): 3378, 3303 psi
Elongation ($E_b$): 12.8%, 8.8%
Modulus ($M_i$): 306, 304 kpsi
0° F. Izod impact: 2.5, 2.3 ft in/in of notch (hinge break)

The molded product had a resistivity, measured by method 2 on a bar 1.125"×0.688"×0.125", of 2.3 ohm cm. In the electroplating procedure, two bars showed coverage of a trace and 100% in the nickel strike and about 10% and 100% in the copper plating. Both copper coatings were very coarse and showed poor adhesion before and after baking.

EXAMPLE 12

A. A mixture of 5 lb of uncalcined "Harwick" GK kaolinite clay, 5 lb of Cabot "Vulcan" XC-72 carbon black, and enough cyclohexane to give a consistency necessary for good mixing was homogenized in a paint mill and filtered, and the solid was dried. A portion of the solid product thus obtained was dried further at 150° C. for 18 hours in a 30-liter/hr stream of nitrogen.

B. By essentially the method of Example 1, part B, a dispersion was made up by combining in the stated order 600 ml of cyclohexane, 4 mmol of triisobutylaluminum, 60 g of the dried carbon-clay mixture, and a solution of 0.100 g of tetrabenzylzirconium in 5 ml of toluene. The dispersion was processed with ethylene at 40° C. and 100 psi for 14 min at which time the supply cylinder showed a loss of about 40 g of ethylene. The particulate solid product was sieved to give 12 g on 12 mesh, 27 g through 12 mesh on 16 mesh, 55 g through 16 mesh on 28 mesh, and 11 g through 28 mesh. The third fraction gave 21.81% ash on combustion, corresponding to a polyethylene/carbon/clay content of 50.8/25.4/25.4.

A plaque made by the method of Example 1, part B, had a resistance of 11 ohms across 6", and test bars had the following properties:

Tensile (T): 3263, 3133 psi
Elongation ($E_b$): 3.4%, 2.1%
Modulus ($M_i$): 497, 482 kpsi
0° F. Izod impact: 1.5, 1.8 ft lb/in of notch (hinge break)

C. The resistivity of the molded plaque of part B, measured by method 2 on a bar 1.125"×0.562"×0.125", was 1.6 ohm cm. When two bars were electroplated by the method of Example 1, part C, the coverages were 100% and about 75% in the nickel strike and 100% and 100% in the copper plating. The copper coatings were very coarse. They showed good-to-excellent and poor adhesion before baking and good-to-excellent and excellent adhesion after baking.

EXAMPLE 13

Example 12 was repeated, except that clay calcined at 950° C. was used, the final drying step was at 500° C., and 3.5 mmole of triisobutylaluminum and 0.140 g of tetrabenzylzirconium were used. The polymerization required 11 minutes. The fraction of the particulate solid that was sieved through 28 mesh on 42 mesh gave 27.73% ash on combustion, corresponding to a polyethylene/carbon/clay content of 55.4/27.7/27.7. The molded plaque had a resistance of 10 ohms across 6", and test bars had the following properties:

Tensile (T): 3196, 3274 psi
Elongation ($E_b$): 12.8%, 11%
Modulus ($M_i$): 564, 588 kpsi
0° F. Izod impact: 1.5, 1.5 ft lb/in of notch The resistivity of the molded product, measured by method 2 on a bar 1.125"×0.5×0.125", was 1.3 ohm cm. In the electroplating procedure, two bars showed coverages of 100% and about 50% in the nickel strike and 100% and 100% in the copper plating. The copper coatings were rather fine. They showed good-to-excellent adhesion before baking and good-to-excellent and excellent adhesion after baking.

EXAMPLE 14

A. Chromium triacetate monohydrate (0.4 g) was dissolved in 500 ml of methanol, to give a solution with a pH of about 5.5. A slurry of this solution, 330 g of "Vulcan" XC-72 carbon black, and an additional 500 ml of methanol was milled with pebbles on a horizontal mill for 18 hours. The pasty mass was diluted with an additional 500 ml of methanol; the pH of the liquid at this point was about 7. Milling was continued for 6 hours, after which time another 500 ml of methanol was added, and milling was then continued for approximately 40 hours, after which time the pH of the liquid was 6.5. The solid was separated from the milling stones and collected on a filter with the help of an additional 800 ml of methanol. The filtrate had the green color of the original chromium triacetate solution. The solid was dried in air and then further dried in a stream of nitrogen at 195° C. for nine days.

B. Engelhard "Satintone"-1 calcined kaolinite clay (600 g) was dried at 190° C. for three hours. It was then added with stirring to a solution of 4 ml of "Volan" L (Du Pont Co., methacrylatochromium chloride in isopropyl alcohol; 6% Cr (III); 0.228 g Cr) in 600 ml of distilled water containing 10 ml of isopropyl alcohol and 4 ml of 1% ammonium hydroxide solution. The pH of the resulting slurry was 5.0. To the slurry was then added with stirring a solution of 1 ml of "Volan" L solution and 1 ml of ammonium hydroxide solution in 200 ml of water. The slurry was tumbled for 24 hours in a 1-gal jar containing milling stones. The stones were separated, and the slurry was filtered. The filtrate was nearly colorless. The solid on the filter was washed with acetone and dried further at 190° C. in a stream of nitrogen for 40 hours.

C. A slurry was made up consisting of 95 g of the chromium-treated carbon black of part A, 164 g of the chromium-treated kaolinite clay of part B, 6 mmole of triethylaluminum, and about 750 ml of heptane. A 1-gal autoclave equipped with a stirrer, which system had been purged with nitrogen at 150° C. and cooled, was charged under nitrogen in the stated order with 0.35 gal of hexane, 4.8 mmole of triethylaluminum, and the carbon-clay slurry described just above. The autoclave was closed, stirring was started, the system was heated to 60° C., and the reaction mixture was pressured with ethylene at 60° C. and 150 psi for 20 hours, with repressuring as necessary. During this time the supply cylinder lost 83 g of ethylene.

The autoclave was cooled and opened, the mixture was filtered, and the solid on the filter was rinsed with methanol containing about 0.1% "Irganox" 1010 antioxidant and air-dried. The product was a fine black powder that gave 45.1% ash on combustion, corresponding to 45.1% clay. Thermogravimetric analysis indicated a carbon content of 27.3%. The overall polyethylene/carbon/clay composition was therefore 27.6/27.3/45.1. Test bars molded at 180° C. and 3000 psi had the following properties:

Tensile (T): 2866, 2936 psi
Elongation ($E_b$): 3.0%, 2.7%
Modulus ($M_i$): 593, 687 kpsi
Flexural Strength: 6154, 6319 psi
0° F. Izod impact: 0.70, 0.68 ft lb/in notch The resistivity of a molded bar 42 mm×4.4 mm×3.25 mm, measured by method 1, was 0.2 ohm cm.

EXAMPLE 15

This example illustrates the use of alumina trihydrate as the inorganic filler compound.

A. By essentially the procedure of Example 4, part A, 2000 g of "Vulcan" XC-72 carbon black, 2000 g of "Alcoa" C-30BF alumina trihydrate, and about 3 gal of cyclohexane was milled to a homogeneous dispersion, and the dispersion was treated with 250 ml of tetraisopropyl titanate. The solid was separated, washed, and air-dried. A portion of the solid thus obtained was further dried at 160° C. for 18 hr in a stream of nitrogen at 30 liters/hr.

B. By essentially the method of Example 1, part B, a dispersion was made by combining in the stated order 600 ml of cyclohexane, 1 mmol of triisobutylaluminum, 50 g of the dried 1//1 carbon/alumina trihydrate, and an additional 3 mmol of triisobutylaluminum. The dispersion was processed with ethylene at 40° C. and 100 psi for 10 hr, at which time the supply cylinder showed a loss of about 35 g of ethylene. The dried product was 64 g of a mixture of a powder and larger flakes. It gave 18.75% ash on combustion, corresponding to a polyethylene/carbon/alumina trihydrate composition of 42.8/28.6/28.6. The resistance of a molded plaque was 10 ohms across 6", and test bars had the following properties:

Tensile (T): 3343, 3339 psi
Elongation ($E_b$): 11%, 33%
Modulus ($M_i$): 390, 338 kpsi
0° F. Izod impact: 3.7, 3.7 ft lb/in of notch
264-psi Heat deflection: 84° C., 81° C.

EXAMPLE 16

A. A portion of the 1/1 carbon/clay mixture of Example 5, part A, was sieved through 80 mesh and dried at 500° C. for 18 hr in a stream of nitrogen at 30 l/hr. By essentially the method of Example 1, part B, a dispersion was made up by combining in the stated order 600 ml of cyclohexane, 4 mmol of triisobutylaluminum, 65 g of the 1/1 carbon/clay mixture, and a solution of 0.050 g of tetrabenzylzirconium in 5 ml of toluene. The dispersion was processed with ethylene at 40° C. and 100 psi until about 45 g of ethylene had been consumed. The particulate solid product was sieved to give 3 g through 12 mesh on 16 mesh, 44 g through 16 mesh on 28 mesh, and 54 g through 28 mesh. The third fraction gave 30.24 ash on combustion, corresponding to a polyethylene/carbon/clay composition of 39.6/30.2/30.2.

A plaque made by the method of Example 1, part B, had a resistance of 6.5 ohms across 6". Test bars from the plaque had the following properties:

Tensile (T): 2050, 2167 psi
Elongation ($E_b$): 4.8%, 6.6%
Modulus ($M_i$): 246, 254 kpsi
0° F. Izod impact: 1.3, 1.1 ft lb/in of notch B. The resistivity of the molded product of part A, measured by method 2 on a bar 1.125"×0.5"×0.125" was 1.1 ohm cm.

(1) An uncleaned bar of the molded product was submitted to a Watts nickel strike as described in Example 1, part C, except that the bath contained no boric acid. The bar was rinsed in running water for 1 minute, dipped in aqueous 10% sulfuric acid for 20 seconds, rinsed in running water for 20 seconds, and then electroplated with copper by the "UBAC" process of Example 1, part C. The copper coating was bright and had an orange-peel texture. The adhesion, after baking at 105° C. for 1 hour, was good. When the foregoing process was repeated, except that the nickel strike was omitted, the adhesion of the copper coating was fair.

(2) The procedure of part (1) was repeated, except that a clean bar that had not been handled previously was used. The copper coating had a fine orange-peel texture, and adhesion was fair-to-good. Coverage in the nickel strike was 100%.

(3) Another bar of the molded product was dipped for one minute at 67° C. in an aqueous 1% solution of "Alkanol" DW anionic surfactant, rinsed in running water for three minutes, dried in a circulating-air oven at 105° C. for 30 minutes, and then subject to the nickel strike and the copper plating as in part (1). The pick-up in the nickel strike was slight. The copper coating had an orange-peel texture and excellent adhesion (could-not-start bond).

(4) The procedure of part (3) was repeated through the nickel strike, except that the oven-drying was omitted. There was no pick-up in the nickel strike. The bar was then rinsed in water for 15 seconds, oven-dried at 105° C. for 30 minutes, and then submitted to the procedure of part (3) beginning with the nickel strike. The nickel-strike pick-up was only slight. Nevertheless, the adhesion of the final copper coating was excellent (could-not-start bond). The copper coating had an orange-peel texture.

(5) The procedure of part (4) was repeated, except that the nickel strike was omitted. The copper coating had the same appearance and adhesion was very good.

(6) The procedure of part (5) was repeated, except that the oven-drying was omitted. Adhesion of the copper coating was fair-to-poor.

EXAMPLE 17

A. By essentially the procedure of Example 4, part A, a titanium-treated carbon black was prepared from 2000 g of "Vulcan" XC-72 carbon black, 3 gal of cyclohexane, and 200 ml of tetraisopropyl titanate. A portion of the titanium-treated carbon black thus obtained was dried at 500° C. for 18 hr under a stream of nitrogen at 30 liters/hr.

B. By essentially the method of Example 4, part B, a dispersion was made up by combining in the stated order 600 ml of cyclohexane, 1 mmol of triisobutylaluminum, 50 g of the tatanium-treated carbon black, and an additional 3 mmol of triisobutylaluminum. The dispersion was processed with ethylene at 50° C. and 100 psi for 1 hr and 34 min, at which time the supply cylinder showed a loss of 50 g of ethylene. The product was 65 g of a polyethylene/carbon composite as a mixture of flakes and powder. Thermogravimetric analysis showed 65.5% polyethylene, 32.4% carbon, and 2.0% ash.

A plaque measuring 6.5"×3.5"×0.125", made by heat-compression molding, had a resistance of 20 ohms across 6", and test bars had the following properties:

Tensile (T): 3885, 3841 psi
Elongation ($E_b$): 125%, 148%
Modulus ($M_i$): 233, 225 kpsi
0° F. Izod impact: 12.9, 9.0 ft lb/in of notch

EXAMPLE 18

By essentially the method of Example 14, part C, a 1-gal autoclave was charged with 0.50 gal of hexane, 9.6 mmol of triethylaluminum, 98 g of the chromium-treated "Vulcan" XC-72 carbon black of Example 14, part A, and an additional 6.4 mmol of triethylaluminum.

The mixture was processed with ethylene at 55° C. and 150 psi for 39 hr, during which time 61 g of ethylene was consumed.

The product, worked up by the method of Example 14, comprised 146 g of fine powder and 4 g of granular material. Thermogravimetric analysis showed a carbon content of 66.8%. Test bars molded at 180° C. and 3000 psi had the following properties:

Tensile (T): 2696, 2469 psi
Elongation ($E_b$): 20.5%, 11.6%
Modulus ($M_i$): 321, 293 kpsi
Flexural strength: 5419, 5613 psi
0° F. Izod impact: 1.9, 2.0 ft lb/in of notch The resistivity of the molded product was 0.08 ohm cm (method 1).

EXAMPLE 19

Under an atmosphere of nitrogen a slurry was made up containing 100 g of the chromium-treated carbon black of Example 14, part A, 600 ml of heptane, and 11.2 mmol of triethylaluminum. By essentially the method of Example 14, a 1-gal autoclave was charged with 0.35 gal of hexane, 3.2 mmole of triethylaluminum, and the slurry described above. The mixture was processed with ethylene at 55° C. at 150 psi for 21.5 hr, during which time the supply cylinder lost 37 g of ethylene. The polyethylene/carbon composite thus produced was separated by filtration, washed with methanol, and air-dried. It weighed 110.7 g and consisted almost entirely of a fine powder. The carbon content, calculated by weight difference, was 90.3%. The product was hot-pressed at 175° into coherent flexible films and bars. The resistivity of one of the bars measured by method 1 was 0.20 ohm cm.

What is claimed is:

1. A solid, halogen-free, homogeneous, particulate, polyolefin/conductive carbon composite which comprises by weight
   (a) 15 to 60% of ultra high molecular weight polyolefin selected from the group consisting of polyethylene and copolymers of ethylene containing up to 15% by weight of units derived from one or more 1-alkenes of 3 to 10 carbons, and
   (b) 40 to 85% of finely-divided filler, said filler comprising by weight, based on the total composite,
      (1) 15 to 75% of conductive carbon having a weight-average equivalent spherical particle diameter of 5 to 500 millimicrons, and
      (2) 10 to 70% of inorganic filler compound having a neutral-to-acidic surface and a weight-average equivalent spherical particle diameter, of 0.1 to 50μ,
in which essentially all of the polyolefin is polymerized onto the surface of the filler, and essentially all of the filler has polyolefin polymerized onto its surface, and the composite has a resistivity of not more than 5 ohm cm in compression molded form.

2. The composite of claim 1 in which the polyolefin is polyethylene.

3. The composite of claim 2 in which the conductive carbon has a rubber formulation resistivity of less than 100 ohm cm.

4. The composite of claim 3 which contains 20–55% polyethylene, 20–60% conductive carbon, 20–60% inorganic filler compound, and 45–80% total filler.

5. The composite of claim 4 in which the conductive carbon has a rubber formulation resistivity of less than 50 ohm cm.

6. The composite of claim 5 in which the inorganic filler compound is kaolinite clay.

7. The composite of claim 5 in which the inorganic filler compound is an alumina hydrate.

* * * * *